(12) United States Patent
Hoffmann

(10) Patent No.: US 6,921,099 B2
(45) Date of Patent: Jul. 26, 2005

(54) APPARATUS FOR RELEASABLY COUPLING A TRAILER OR OTHER VEHICLE ACCESORY TO A VEHICLE

(76) Inventor: Detlef Uwe Hoffmann, 2903 Shuttle Street, Abbotsford, British Columbia (CA), V4X 2S1

( * ) Notice: Subject to any disclaimer, the term of this patent is extended or adjusted under 35 U.S.C. 154(b) by 0 days.

(21) Appl. No.: 10/742,848

(22) Filed: Dec. 23, 2003

(65) Prior Publication Data

US 2004/0188980 A1 Sep. 30, 2004

Related U.S. Application Data

(60) Provisional application No. 60/457,020, filed on Mar. 25, 2003.

(51) Int. Cl.[7] .............................................. B62K 27/00
(52) U.S. Cl. ......................... 280/292; 280/204; 224/519
(58) Field of Search ................................ 280/202, 204, 280/288.4, 292, 504, 515; D12/115; 224/519, 509, 924

(56) References Cited

U.S. PATENT DOCUMENTS

| 559,761 | A | * | 5/1896 | Trancle-Armand | 280/204 |
|---|---|---|---|---|---|
| 2,478,736 | A | * | 8/1949 | Balzen | 280/477 |
| 2,665,144 | A | * | 1/1954 | Birdwell | 280/462 |
| 3,937,489 | A | * | 2/1976 | Hawes et al. | 280/204 |
| 4,027,899 | A | | 6/1977 | Hawes et al. | 280/204 |
| 4,511,155 | A | | 4/1985 | Galloway | 280/204 |
| 4,890,854 | A | * | 1/1990 | Hoover | 280/504 |
| 5,469,998 | A | | 11/1995 | Van Dusen et al. | 224/506 |
| 5,680,975 | A | * | 10/1997 | Stapleton | 224/519 |
| 6,039,227 | A | | 3/2000 | Stark | 224/521 |
| 6,406,050 | B1 | * | 6/2002 | Taggart | 280/292 |
| 2002/0096859 | A1 | | 7/2002 | Versaw | 280/511 |
| 2004/0135341 | A1 | * | 7/2004 | Versaw | 280/292 |

FOREIGN PATENT DOCUMENTS

CH          254986          5/1948

* cited by examiner

*Primary Examiner*—Avraham Lerner
(74) *Attorney, Agent, or Firm*—Lance A. Turlocki

(57) ABSTRACT

Apparatus for releasably coupling a vehicle accessory to a vehicle is disclosed. The apparatus comprises a housing, an accessory coupler for coupling a vehicle accessory to the housing, and a hitch pin. The housing comprises an upper wall, a lower wall, and opposed side walls extending between the upper and lower walls, which walls together define a sleeve having an open rearward end. The sleeve has a height between its upper and lower walls and a width between its side walls, the width being substantially greater than the height. The upper and lower walls each have an associated hole centrally positioned widthwise of the sleeve, the holes being aligned on a common axis. The housing is adapted for attachment in an operative position to an upper rearward part of the vehicle with the open end of the sleeve depending rearwardly. In cases where the vehicle is a two-wheeled motorcycle or scooter, the housing preferably is attached to the vehicle in a location above the rear wheel of the vehicle.

15 Claims, 16 Drawing Sheets

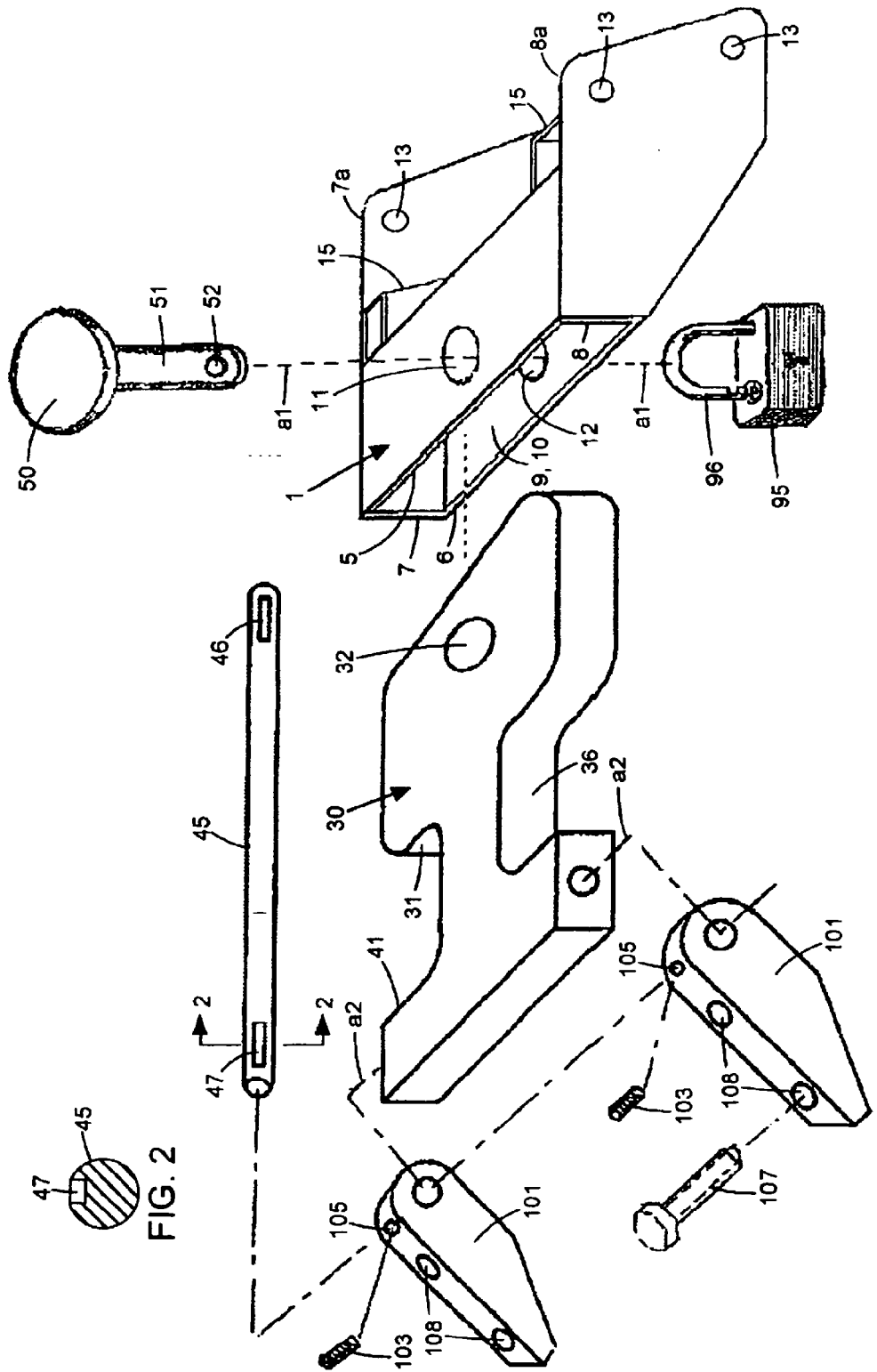

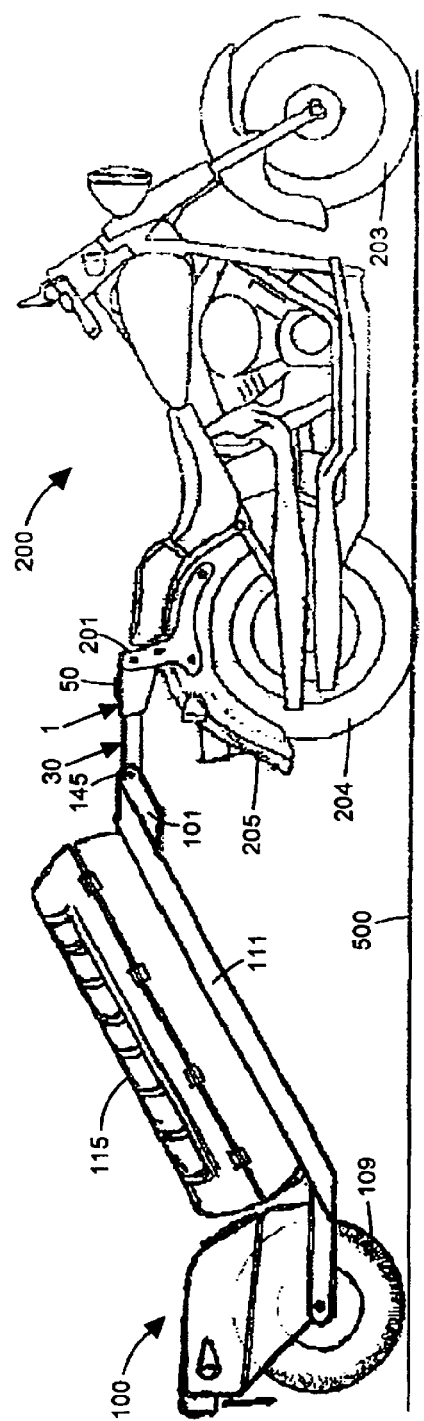
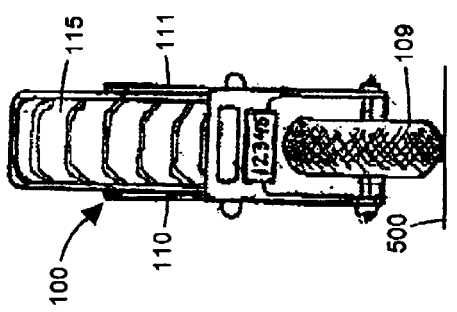
FIG. 7
FIG. 8

US 6,921,099 B2

APPARATUS FOR RELEASABLY COUPLING A TRAILER OR OTHER VEHICLE ACCESORY TO A VEHICLE

CROSS-REFERENCE TO RELATED APPLICATIONS

This application is related to U.S. provisional application No. 60/457,020 filed Mar. 25, 2003, entitled "Quick change motorcycle hitch, trailers and accessories", naming Detlef Uwe Hoffmann as the inventor. The contents of the provisional application are incorporated here by reference in their entirety, and the benefit of the filing date of the provisional application is hereby claimed for all purposes that are legally served by such claim for the benefit of the filing date.

BACKGROUND OF THE INVENTION

The present invention relates to apparatus for releasably coupling a trailer or other vehicle accessory such as a luggage carrier, pet carrier, or the like to a vehicle. While the apparatus disclosed is considered particularly suitable for use in conjunction with motorcycles, it readily can be adapted for use in conjunction with other vehicles including all terrain vehicles.

Motorcycle enthusiasts take pleasure in the freedom and exhilaration that are brought by the highways, and they are often concerned about maintaining the clean lines and classic form of their vehicles. However, it occasionally becomes necessary or desirable to connect a trailer or other accessory which can be used to hold or carry extra gear such a golf equipment, camping equipment, luggage, etc.

Towing a trailer with a motorcycle is well known and various hitch arrangements for doing so are disclosed in the patent literature: see, for example, U.S. Pat. No. 3,937,489 (Hawes et al.) granted on Feb. 10, 1976 and related U.S. Pat. No. 4,027,899 (also Hawes et al.) granted on Jun. 7, 1977; U.S. Pat. No. 4,511,155 (Galloway) granted on Apr. 16, 1985; U.S. Pat. No. 6,305,702 (Alford) granted on Oct. 23, 2001; and, U.S. patent application Publication No. 2002/0096859 A1 (Versaw) published on Jul. 25, 2002.

Many known hitch arrangements for motorcycles are relatively unsightly and are generally dedicated to the singular task of providing a hitch for a trailer and not a hitch which is well adapted to enable stable connection not only of a trailer but a variety of other vehicle accessories. But, there are limited exceptions. Both Alford and Versaw address the issue of unsightliness, and Alford specifically discloses a "cooler carrier" that may be connected to a supporting frame where a trailer might otherwise be coupled with a removable ball hitch. Versaw specifically discloses an arrangement with a removable ball hitch but does not appear to suggest that other vehicle accessories may be connected in the same manner as the removable ball hitch. However, for reasons indicated below, ball hitches are undesirable. Further, Alford's cooler carrier will be supported in a position relatively low and behind the vehicle where it may be undesirably exposed to vehicle exhaust fumes and to mud and water thrown back by the rear wheel. Moreover, the carrier shown in Alford appears to have a substantial width which could interfere with a motorcyclist's ability to lean heavily into turns.

Ball hitches may be considered undesirable for various reasons. Firstly, they are not well adapted to easily prevent theft of a trailer. Secondly, they are normally considered best suited for a two-wheeled trailer—but a two-wheeled trailer may detract from the otherwise clean lines of a motorcycle. Thirdly, when negotiating turns with a two-wheeled trailer, a motorcyclist has to slow down because the trailer can impose undue centrifugal forces not encountered in the absence of a trailer. The fun of riding a motorcycle can be lost.

Hawes et al., supra, show a single-wheeled motorcycle trailer which does not use a ball hitch and which in principle should permit a motorcyclist to better maintain speed while negotiating turns. However, the hitch which is disclosed is not well adapted to connect an accessory other than a trailer and is relatively exposed as a trailer hitch when not in use.

Accordingly, there is a need for apparatus which allows a trailer or other vehicle accessory to be quickly and releasably coupled to a vehicle, which allows not only a trailer but also other vehicle accessories to be readily attached, which does not undesirably expose such other accessories to exhaust fumes or mud and water thrown back from the vehicle, and which can be adapted to minimally detract from the aesthetic appearance of the vehicle.

BRIEF SUMMARY OF THE INVENTION

In a broad aspect of the present invention, there is provided apparatus for releasably coupling a vehicle accessory to a vehicle, the apparatus comprising a housing, an accessory coupler for coupling a vehicle accessory to the housing, and a hitch pin. The housing comprises an upper wall, a lower wall, and opposed side walls extending between the upper and lower walls, which walls together define a sleeve having an open rearward end. The sleeve has a height between its upper and lower walls and a width between its side walls, the width being substantially greater than the height. The upper and lower walls each have an associated hole centrally positioned widthwise of the sleeve, the holes being aligned on a common axis. The housing is adapted for attachment in an operative position to an upper rearward part of the vehicle with the open end of the sleeve depending rearwardly. In cases where the vehicle is a two-wheeled motorcycle, the housing preferably is attached to the motorcycle in a location above the rear wheel of the motorcycle. Advantageously, this may be done by attachment to conventional motorcycle fender struts.

The accessory coupler includes an accessory end for connecting to a vehicle accessory and a coupling end slidably receivable through the open end of the housing sleeve. The coupling end includes an associated hole alignable with the above mentioned common axis when the coupling end is received by said sleeve. The hitch pin is removably insertable through all of said holes to a position securing the coupling end within said sleeve. Preferably, the hitch pin is adapted to be locked in this position with a suitable lock such as a padlock. This serves not only to better preserve the integrity of the coupling but also to deter theft by unauthorized decoupling.

Advantageously, the prescribed housing is compatible both with accessory couplers that are pivotally held by the hitch pin within the sleeve and with accessory couplers that are fixedly held by the hitch pin within the sleeve.

In one embodiment, the coupling end of the accessory coupler comprises a generally disk-shaped head, the associated hole of the coupling end extending through the head between substantially flat, parallel upper and lower surfaces of the head. The head is pivotally securable by the hitch pin within the sleeve for pivotal movement of the coupler on the above mentioned common axis while said head receives bearing support on such upper and lower surfaces from the upper and lower walls of the housing. In this embodiment, the coupler further comprises a shank extending longitudinally away from the head to the accessory end. The accessory end is adapted for connection of a vehicle trailer to the accessory end, the connection permitting pivotal movement of the trailer relative to the vehicle on an axis extending transverse to the above mentioned common axis. When under tow, the trailer can articulate relative to the vehicle in two perpendicular planes; one plane containing the common axis, and the other plane containing the transverse axis. This allows the trailer to more seamlessly follow the towing vehicle through turns and over uneven road surfaces.

Preferably, the disk-shaped head has an oblong shape with a minor axis extending in line with the above mentioned shank and a major axis extending transverse thereto. Herein, it is to be understood that the term "oblong" includes "elliptical", "rounded rectangular" and other disk shapes that can be recognized to have a minor axis and a major axis, the length of the major axis being greater than that of the minor axis.

The dimensioning of the housing sleeve with a width substantially greater than its height is suited to the use of an oblong shape because the length of the disk's major axis can be made greater than the length of its minor axis thereby avoiding either an unduly large circular head or an unduly small circular head. An unduly large circular head would dictate that the housing sleeve have an unnecessary length or depth. An unduly small circular head fails to take advantage of the bearing support available from a sleeve's full width dimension. An oblong disk-shaped head takes advantage of the sleeve's width dimension because bearing forces can be absorbed by moment arms at significant distances away from the common axis on which the head will pivot without requiring the head to have a circular shape. This provides enhanced stability when a trailer is under tow without requiring an excessively sized head.

In another embodiment of the present invention, pivotal movement of the accessory coupler is not permitted. Here, the coupling end of the coupler is telescopically receivable by the sleeve through the open end of the sleeve, the coupling end being sized such that movement within said sleeve other than telescoping movement is restrained by the sleeve. The accessory end of the coupler may be readily adapted to connect to a variety of accessories. In one case of this embodiment, the accessory end connects to a platform accessory which may be used to carry any of a number of articles such as a pet carrier, tool box, a cooler, etc. In another case, the accessory end connects to a platform accessory which is adapted to carry an animal. In the latter case, the hitch pin advantageously may be formed at one end of a tethering pole with the other end of the pole being adapted for attachment of an animal harnessing leash. In yet another case, the accessory end connects to a tail light accessory.

In conjunction with any of the above embodiments, apparatus in accordance with the present invention advantageously may additionally include a pair of elongated receptacles sized to slidably receive first and second coupling legs of a vehicle accessory which is separate from any accessory coupled to the vehicle with the accessory coupler. Each of such receptacles may be secured to a respective one of the side walls of the housing. Alternately, such receptacles may extend longitudinally atop the upper wall of the housing. In the case of a motorcycle, the additional accessory may be a "sissy bar" as it is known in the trade. Or, the additional accessory may provide armrests and/or a back rest which can give a greater sense of security to a motorcycle passenger.

The foregoing and other features and advantages of the present invention will now be described with reference to the drawings.

BRIEF DESCRIPTION OF THE SEVERAL VIEWS OF THE DRAWING

FIG. 1 is an exploded perspective view of a housing, accessory coupler and hitch pin in accordance with the present invention, together with hardware for connecting a vehicle trailer to the coupler.

FIG. 2 is a cross-section view taken along section line 2—2 in FIG. 1.

FIG. 7 is a side view showing a motorcycle and a trailer coupled to the motorcycle with coupling apparatus as shown in FIG. 1. A container is being carried by the trailer FIG. 8 is a rear end view of the trailer and container shown in FIG. 7.

FIG. 9 shows an arm and back rest structure coupled to the housing shown in FIG. 1.

FIG. 11 additionally shows a bag container strapped to the trailer.

DETAILED DESCRIPTION OF THE INVENTION

Figure 3:
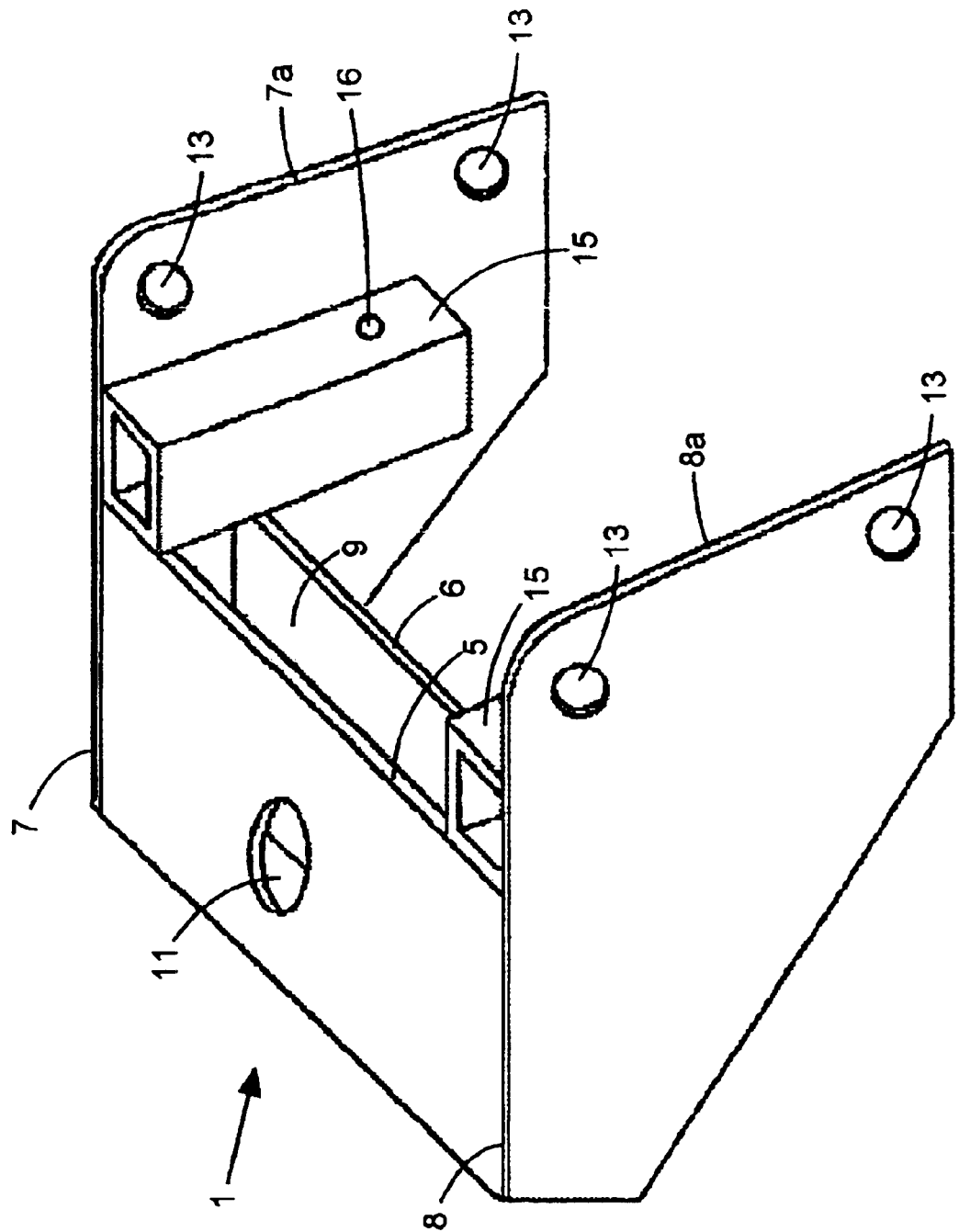
FIG. 3 is a perspective view of the housing shown in FIG. 1, as seen from the forward end the housing.

Referring now to FIGS. 1–8, there is shown a housing generally designated 1, an accessory coupler generally designated 30, and a hitch pin 50, all for releasably coupling a vehicle accessory (namely, a trailer generally designated 100) to a motorcycle generally designated 200.

Housing 1 comprises an upper wall 5, a lower wall 6, and opposed side walls 7, 8 extending between the upper and lower walls. Together, such walls define a rectangular sleeve 9 having an open rearward end 10. Sleeve 9 has a width between side walls 7, 8 which is substantially greater than the height between upper and lower walls 5, 6. In an exemplary case, the sleeve width is about 9 inches and the sleeve height is about 1.5 inches. The sleeve also has a length (or depth). In the same exemplary case, the length is about 4 inches.

A hole 11 extends through upper wall 5, and a hole 12 extends through lower wall 6. Such holes are in axial alignment on a common axis a1.

Figure 4:
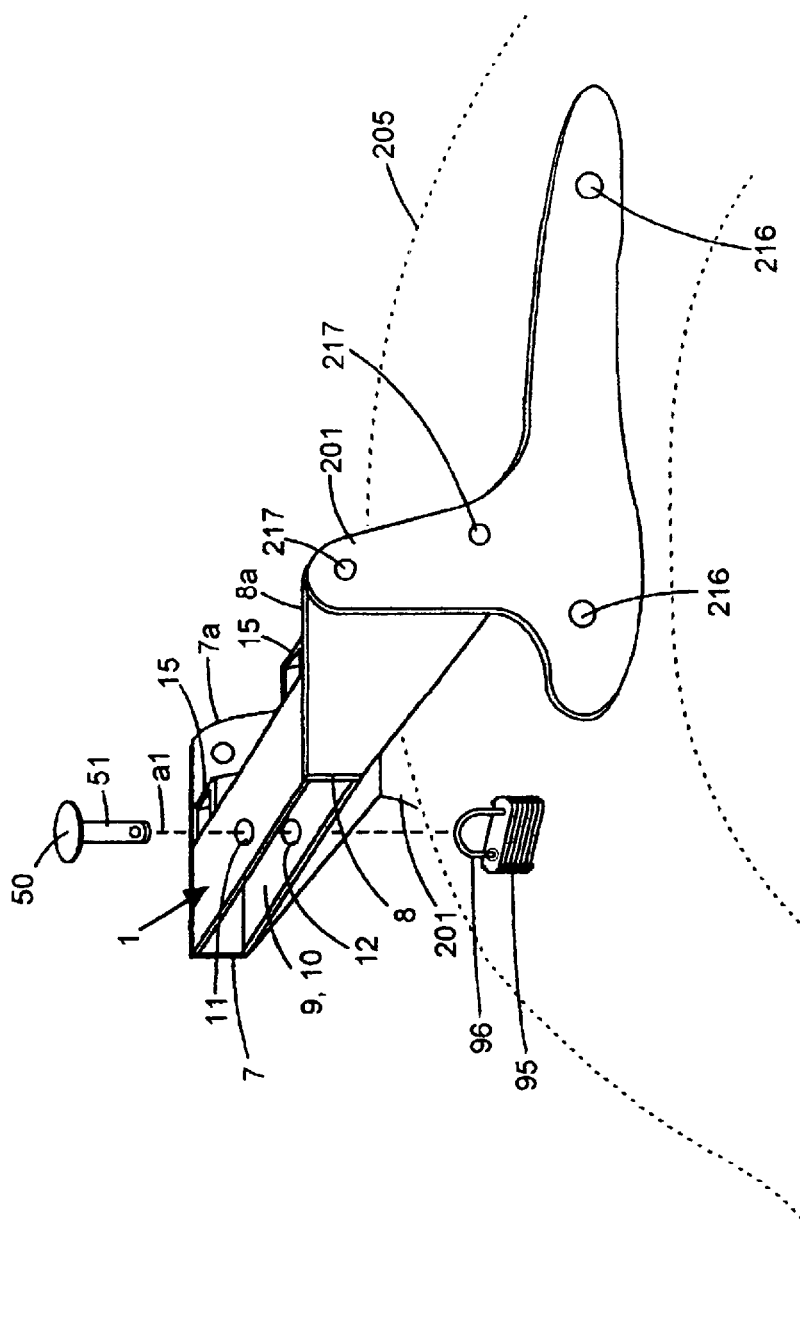
FIG. 4 is a perspective view of the housing shown in FIG. 1 when mounted to fender struts on the rear fender of a motorcycle.
Figure 14:
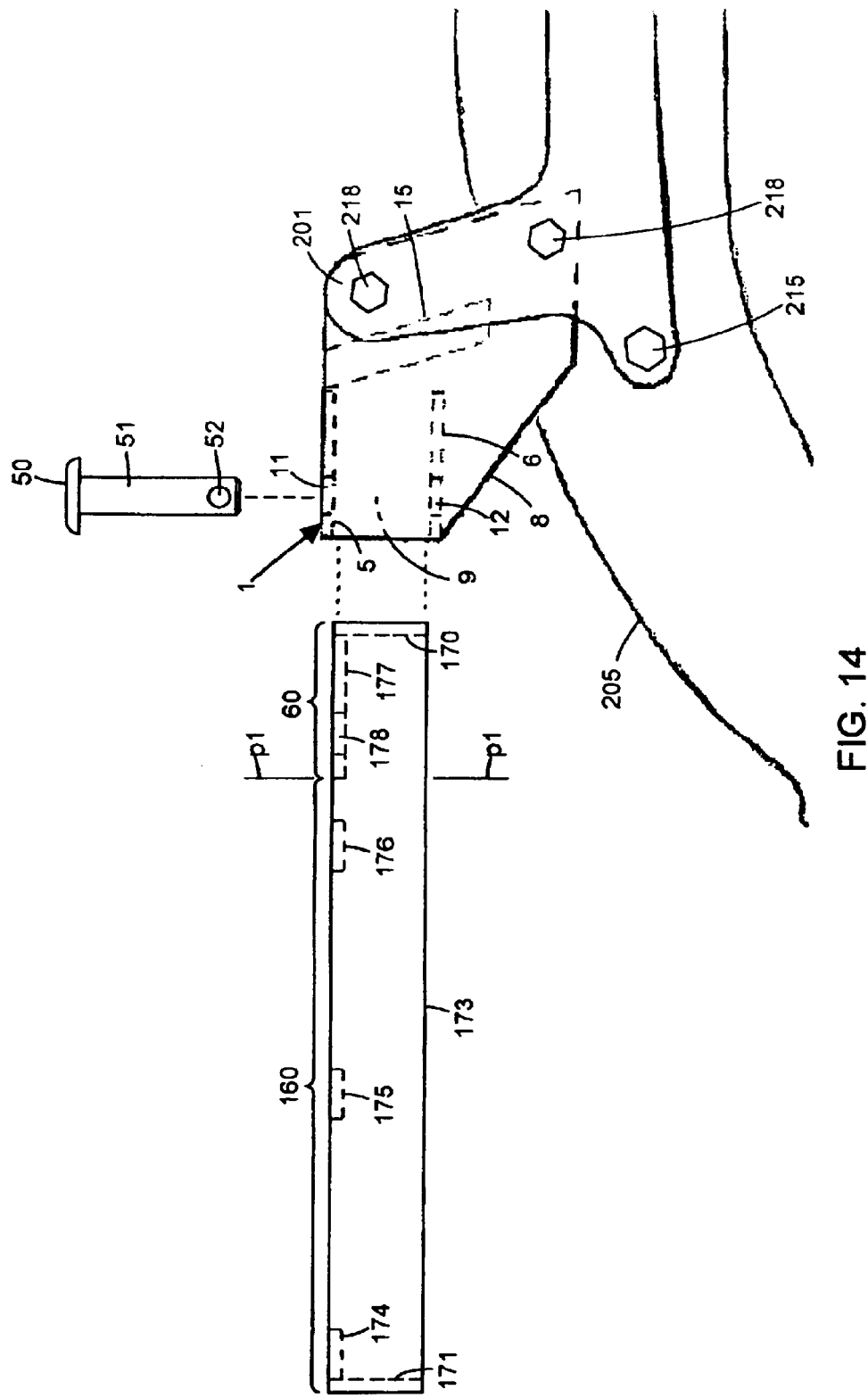
FIG. 14 is a side view of the housing shown in FIG. 1 and a platform accessory exploded away therefrom. An accessory coupler is unitary with the platform accessory.
Figure 15:
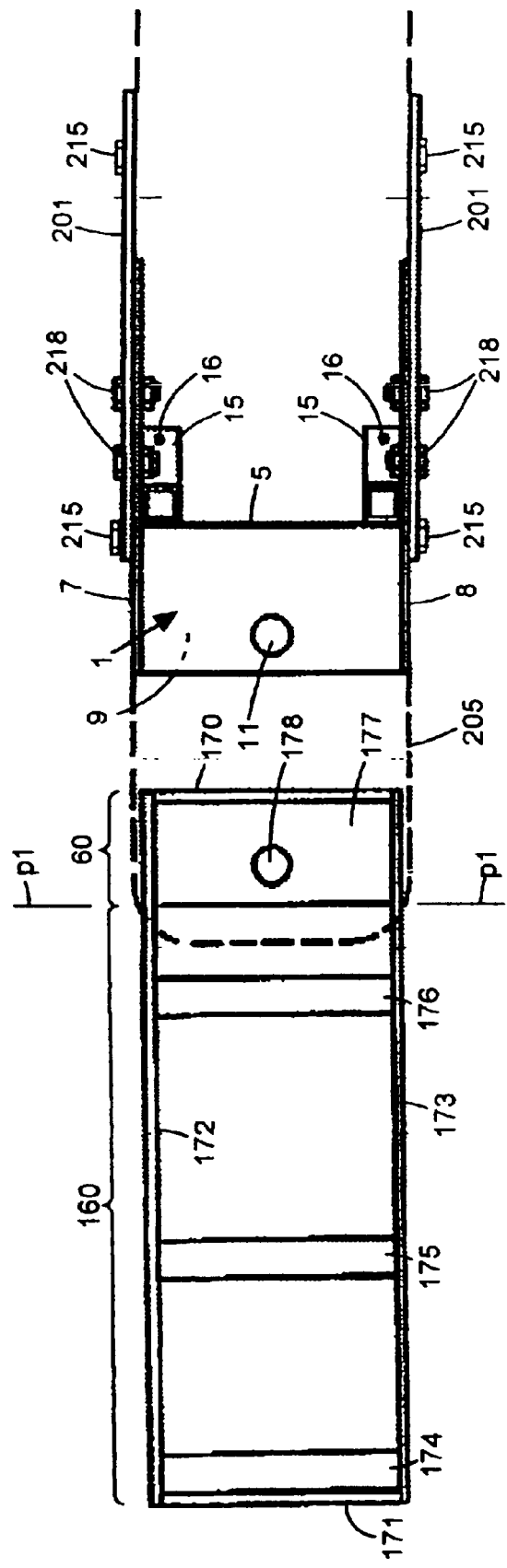
FIG. 15 is a top view of the housing and platform accessory shown in FIG. 14.

Housing 1 is adapted for attachment in an operative position to an upper rearward part of motorcycle 200 with the rearward open end 10 of sleeve 9 depending rearwardly. More particularly, motorcycle 200 includes a pair of upwardly extending fender struts 201 mounted on opposed sides of rear fender 205 of the motorcycle, each by a pair of bolts 215 extending through bolt holes 216 in the strut and through the fender. In FIG. 4, only the bolt holes 216 are shown. Bolts 215 are shown in FIGS. 14–15.

To facilitate attachment of housing 1 to struts 201, side wall 7 includes a forward portion 7*a* which extends forwardly and downwardly from the vicinity of sleeve 9. Likewise, side wall 8 includes a forward portion 8*a* which extends forwardly and downwardly from the vicinity of sleeve 9. Forward portions 7*a*, 8*a* are spaced by the distance between struts 201 and each includes a pair of bolt holes 13 which are positioned to align with corresponding bolt holes 217 in struts 201, thus enabling housing 1 to be bolted to the struts, each by a pair of bolts 218. In FIG. 4 only the bolt holes 217 are shown. Bolts 218 are shown in FIGS. 14–15.

Accessory coupler 30 includes a coupling end in the form of a disk-shaped head 31 slidably receivable by sleeve 9 through open end 10, and an accessory end 41 for connecting to a vehicle accessory (namely motorcycle trailer 100 in the embodiment shown in FIGS. 1–8). A shank 36 extends longitudinally away from head 31 to accessory end 41. A hole 32 which is alignable with common axis a1 within sleeve 9 extends through head 31 between flat, parallel upper and lower surfaces of the head. Hole 32 enables coupler 30 to be pivotally secured within the sleeve by hitch pin 50 when cylindrical shaft 51 of the pin is inserted through hole 11 of upper wall 5, hole 32 of head 31, and hole 12 of wall 6. When head 31 is pivotally secured, then as best seen with reference to FIGS. 5 and 6, housing 1 and coupler 30 may pivot on axis a1 relative to each other from the center position shown in FIG. 5 either clockwise as shown in solid outline in FIG. 6 or anticlockwise as shown in broken outline in FIG. 6. During such movements, head 31 receives bearing support on its upper and lower surfaces from upper and lower walls 5, 6 of housing 1.

Preferably, shaft 51 of hitch pin 50 includes a hole 52 extending transversely through the lower end of the shaft to enable pin 50 to be locked with a lock such as padlock 95, thereby enabling coupler 30 to be locked within sleeve (hole 52 being sized to slidingly receive hasp 96 of the padlock).

Figure 5:
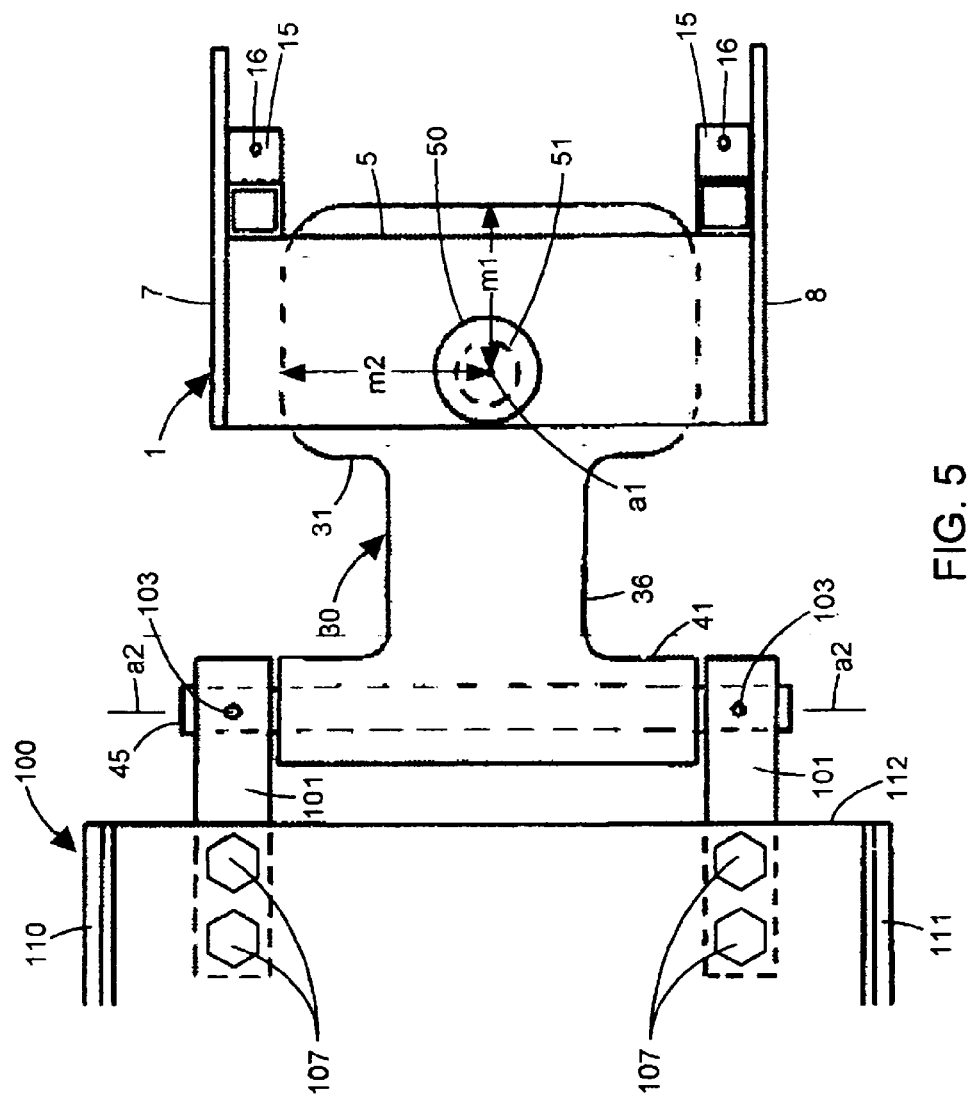
FIG. 5 is a top view showing the accessory coupler in FIG. 1 when coupled to the housing shown in FIG. 1. The forward end of a trailer connected to the coupler is also shown.

In more detail, it is to be noted that head 31 of coupler 30 has a generally oblong shape (in particular, a rounded rectangular shape). By reason of the rounding, and as indicated by broken circular line 33 in FIG. 6, head 31 can pivot clockwise or anticlockwise through a significant angle limited only by the angle at which shank 36 butts into wall 7 or wall 8, as the case may be, of housing 1. Further, and as indicated in FIG. 5, it is to be noted that end 31 can be characterized by a minor axis m1 extending in line with shank 36 and a transverse major axis m2, the length of major axis m2 being greater than the length of the minor axis m1. The differences between such lengths are significant because, as indicated above, an oblong shaped head can take advantage of the relatively wide width dimension of a sleeve 9. More particularly, the oblong disk-shaped head 31 takes advantage of the sleeve's width dimension because bearing forces can be absorbed by moment arms provided by walls 5, 6 against head 31 at significant distances away from the axis a1. At the same time, the overall size and weight of the head is less than it would be if it was circular in shape having a diameter corresponding to the length of major axis m2.

Accessory end 41 of coupler 30 has been adapted to enable pivotal connection thereto of trailer 100. More particularly, and as best seen in FIG. 1, end 41 includes a hole 42 which extends longitudinally through the hole, and which is sized to slidingly receive a cylindrical connecting rod 45. Rod 45 is rotatable within the hole on axis a2. When trailer 100 is connected, rod 45 also extends through a pair of mounting brackets 101 to which the forward end of the trailer normally is secured by bolts 107 extending through a base panel 112 of the trailer (see FIGS. 5–6) and into bolt holes 108 (see FIG. 1) of the associated mounting bracket. (Only one of bolts 107 is shown in FIG. 1, and base panel 112 is not shown in FIG. 1). In this position, rod 45 and brackets 101 are secured to pivot together on axis a2 by means of a pair of set screws 103 which thread through corresponding holes 105 in brackets 101 to engage slots 46, 47 in rod 45.

Housing 1 and accessory coupler 30 may be fabricated from various suitable materials. In the case of the housing, chromed steel may be preferred to provide an attractive appearance. In the case of the accessory coupler, high strength UHMW plastic may be preferred. Such plastic not only offers less weight than steel or other metals such as aluminum, but is resistive to corrosion and avoids any need for lubrication.

An overview illustrating housing 1, accessory coupler 30 and hitch pin 50 when in use for coupling trailer 100 to motorcycle 200 is shown in FIGS. 7–8 while the motorcycle and trailer are travelling on a road surface 500. Trailer 100 is depicted while carrying a hard shell container 115 between side rails 110, 111 which extend along opposed sides of base panel 112 (see FIGS. 5–6) of the trailer. Container 115 may hold a variety of articles (e.g. golf clubs). Depending on the circumstances, it may be considered desirable to releasably secure container 115 to trailer 100 by clamps (not shown) or other suitable means.

With reference to FIG. 8, it will be noted that trailer 100 has a slim line with only a single wheel 109. When motorcycle 200 travels in a straight line, then wheel 109 tracks in line with front and rear wheels 203, 204 of the motorcycle. If road surface 500 is rough or uneven, then trailer 100 will pivot up or down in relation to motorcycle 200 (viz. on axis a2 discussed above) such that wheel 109 tends to maintain surface contact. When motorcycle 200 is leaning or cornering, then trailer 100 will lean with the motorcycle by reason of the bearing interaction between upper and lower walls 5, 6 of housing 1 on coupler 30. Further, when motorcycle 200 is cornering or going through turns, then trailer 100 can pivot on pivot pin 50 in relation to the motorcycle (viz. on axis a1 discussed above) thereby following the motorcycle with a high degree of seamlessness.

Depending on the circumstances, pivoting actions on both axes a1 and a2 of course may occur concurrently.

Figure 9:
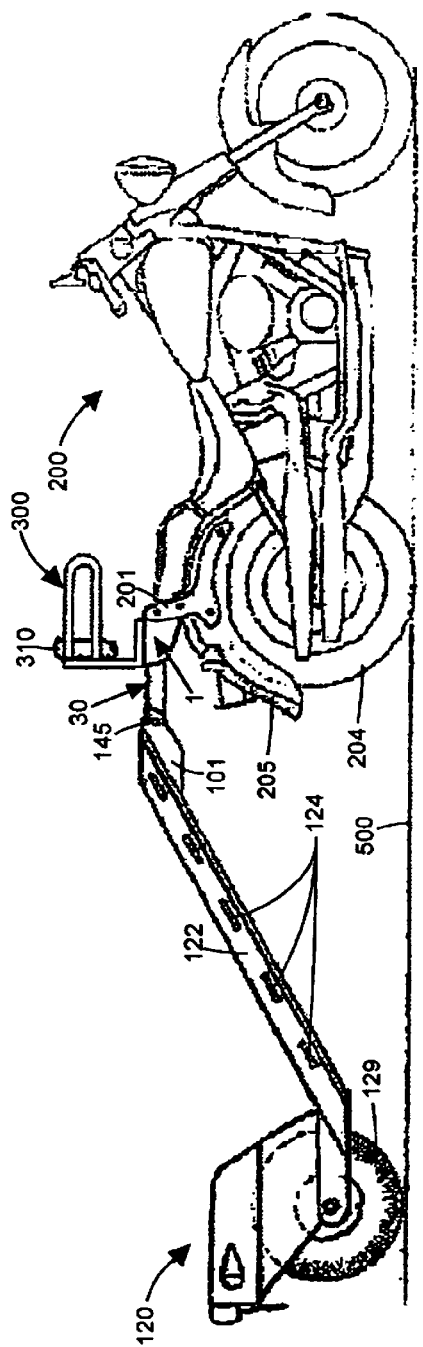
FIG. 9 is a side view showing a motorcycle and a general utility trailer coupled to the motorcycle with coupling apparatus as shown in FIG. 1. In addition.
Figure 10:
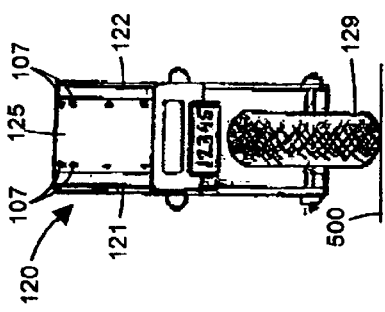
FIG. 10 is a rear end view of the trailer shown in FIG. 9.
Figure 11:
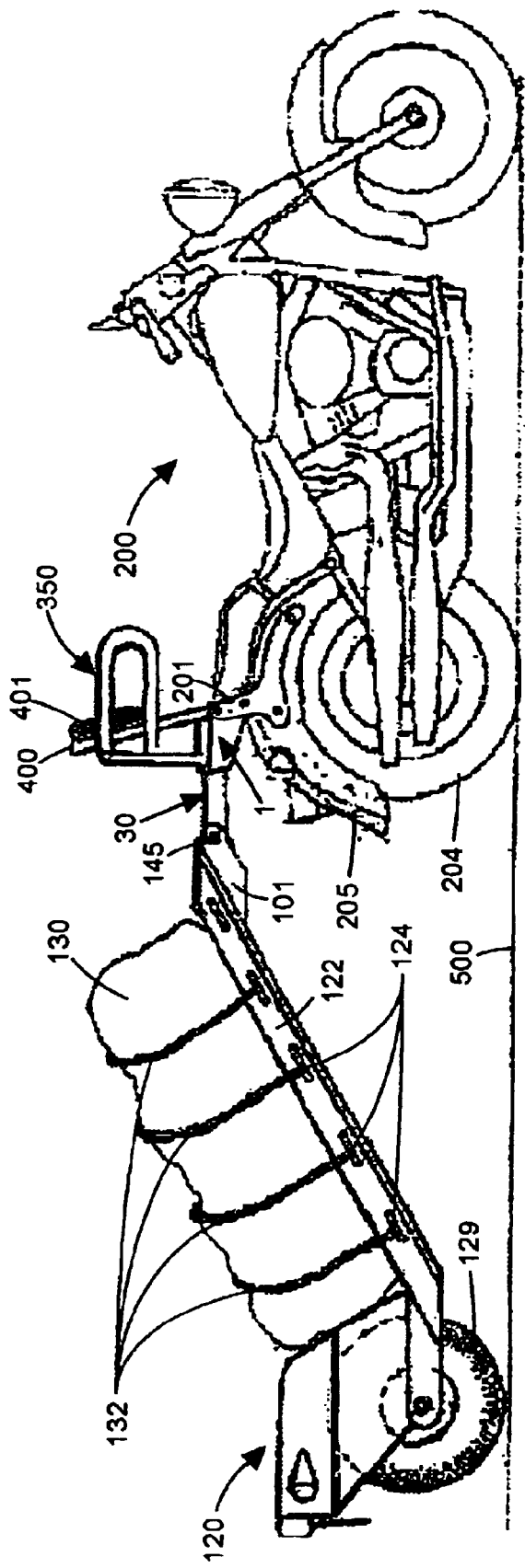
FIG. 11 is a side view similar to FIG. 9, including an arm rest structure coupled to the housing shown in FIG. 1, but showing a conventional "sissy bar" independent of the housing with a back rest attached to the sissy bar.
Figure 12:
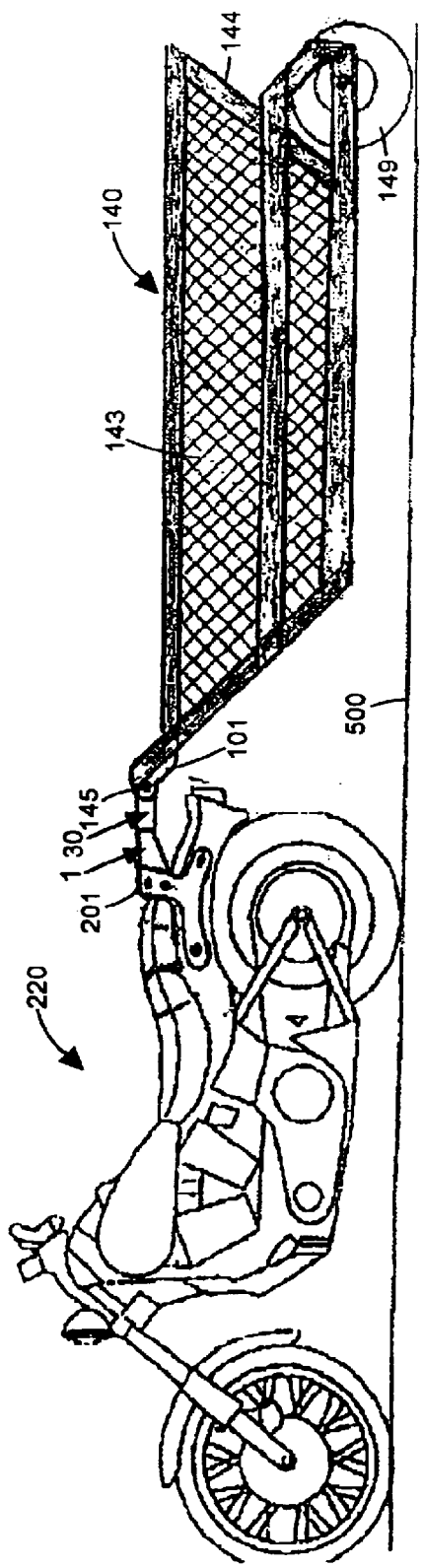
FIG. 12 is a side view showing a motorcycle and a farm produce trailer coupled to the motorcycle with coupling apparatus as shown in FIG. 1.
Figure 13:
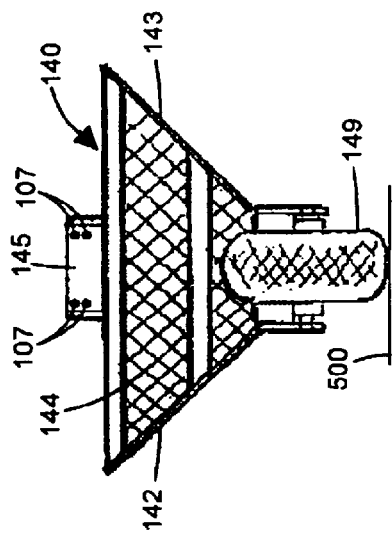
FIG. 13 is a rear end view of the trailer shown in FIG. 12.

As illustrated in FIGS. 9–11 which show a general utility trailer designated 120 and in FIGS. 12–13 which show a farm produce trailer designated 140, differing types of single wheeled trailers may be coupled to a motorcycle utilizing coupling apparatus in the manner described above. In FIGS. 9, 11, the motorcycle is the same as that illustrated in FIG. 7 and is thus identified by the numeral 200. In FIG. 12, the motorcycle is a different model and is thus identified by the numeral 220. However, the differing models do not affect that application of the present invention.

Trailer 120 includes a pair of slotted side rails 121, 122 extending along opposed sides of a base panel 125 (FIG. 10), the latter which is secured to a pair of mounting brackets 101 by bolts 107 in the same manner as base panel 112 of trailer 110. A soft bag-like container 130 (FIG. 11) resting on the base panel is secured to the trailer by means of flexible straps 132 which are strung through slots 124 and around the cargo. Container 130 is not untypical of what a motorcyclist might use to carry camping gear such as a tent, poles, etc.

Trailer 140 includes wire mesh side walls 142, 143, a wire mesh rear wall 144, and a forwardly sloping front panel wall 145, the latter of is secured to a pair of mounting brackets 101 by bolts 107 in the same manner as base panel 112. The use of mesh walls allows produce (not shown) carried by trailer 140 to be exposed to additional fresh air during transport.

While the design trailers for varied purposes, either for motorcycles or otherwise, is not the focus of the present invention, one point to note with reference to FIGS. 7, 9, 11 and 12 is that the position of the trailer wheel (109, 129, 149, as the case may be) is located well rearward of accessory coupler 30 and that the center of gravity of any load carried by the trailer necessarily will be between the trailer wheel and the coupler. This is believed to be desirable in order to minimize any longitudinal impact stresses or shocks that may be imposed on coupler 30, and transmitted to the motorcycle, if the trailer wheel hits bumps while travelling over road surface 500.

Figure 16:
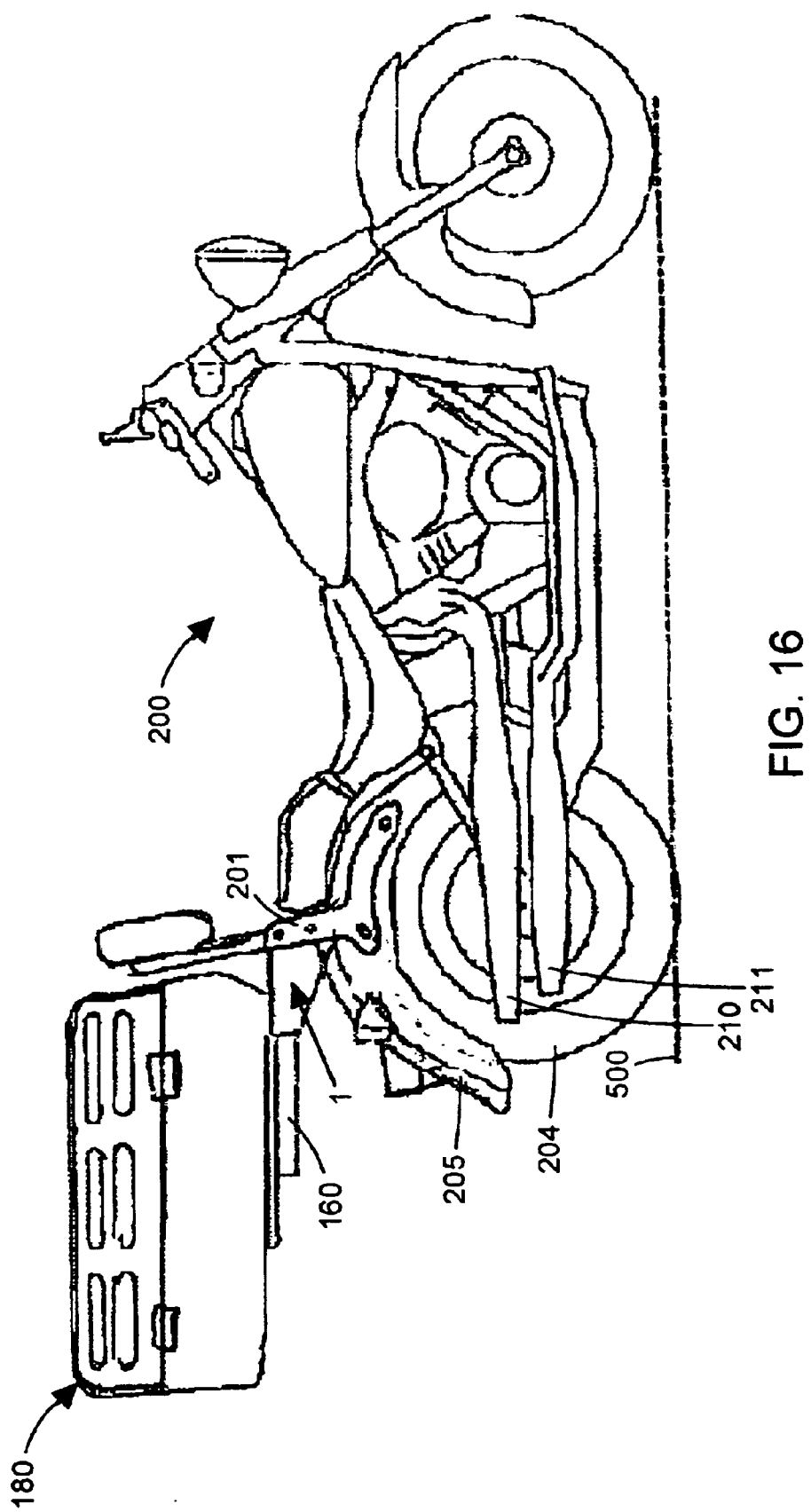
FIG. 16 is a side view showing the platform accessory illustrated in FIGS. 14–15 when coupled to the housing at the back of a motorcycle. A pet carrier is being carried on the platform accessory.

FIGS. 14–16 illustrate an embodiment of the invention wherein an accessory coupler 60 and a platform accessory 160 are constructed as a unitary structure. The structure comprises a rectangular framework having a front wall 170, a rear wall 171, parallel side walls 172, 173 extending between the front and rear walls, and cross-members 174, 175, 176 and 177. Accessory coupler 60 is formed by front wall 170, cross-member 177, and those portions of side walls 172, 173 which run alongside cross-member 177. The accessory end of coupler 60 effectively lies in the plane indicated by line p1 in FIGS. 14–15. The coupling end of coupler 60 is substantially the entire body of the coupler forward of line p1.

As in the case of the embodiment shown in FIGS. 1–8, the embodiment shown in FIGS. 14–16 includes a housing 1 and a hitch pin 50, the housing being mounted to a pair of fender struts 201 secured on opposed sides of rear fender 205 of motorcycle 200. The coupling end of coupler 60 is telescopically receivable by sleeve 9 of housing 1, and is sized such that movement of the coupler within the sleeve other than telescoping movement is restrained by the sleeve. When the coupling end is fully received, then coupler 60 may be secured within the sleeve by means of hitch pin 50; the pin extending through holes 11, 12 in upper and lower walls 5, 6 of the housing, and through hole 178 in cross-member 177. In this position, the pin 50 may be locked with a padlock as described or by other suitable means.

Platform accessory 160 can be used to carry a variety of articles. By way of example, FIG. 16 show the accessory when used to carry pet carrier 180. Note that housing 1 and accessory coupler 60 (not visible in FIG. 16) advantageously hold platform accessory 160 in a position elevated well above motorcycle exhausts 210, 211 and road surface 500.

Figure 17:
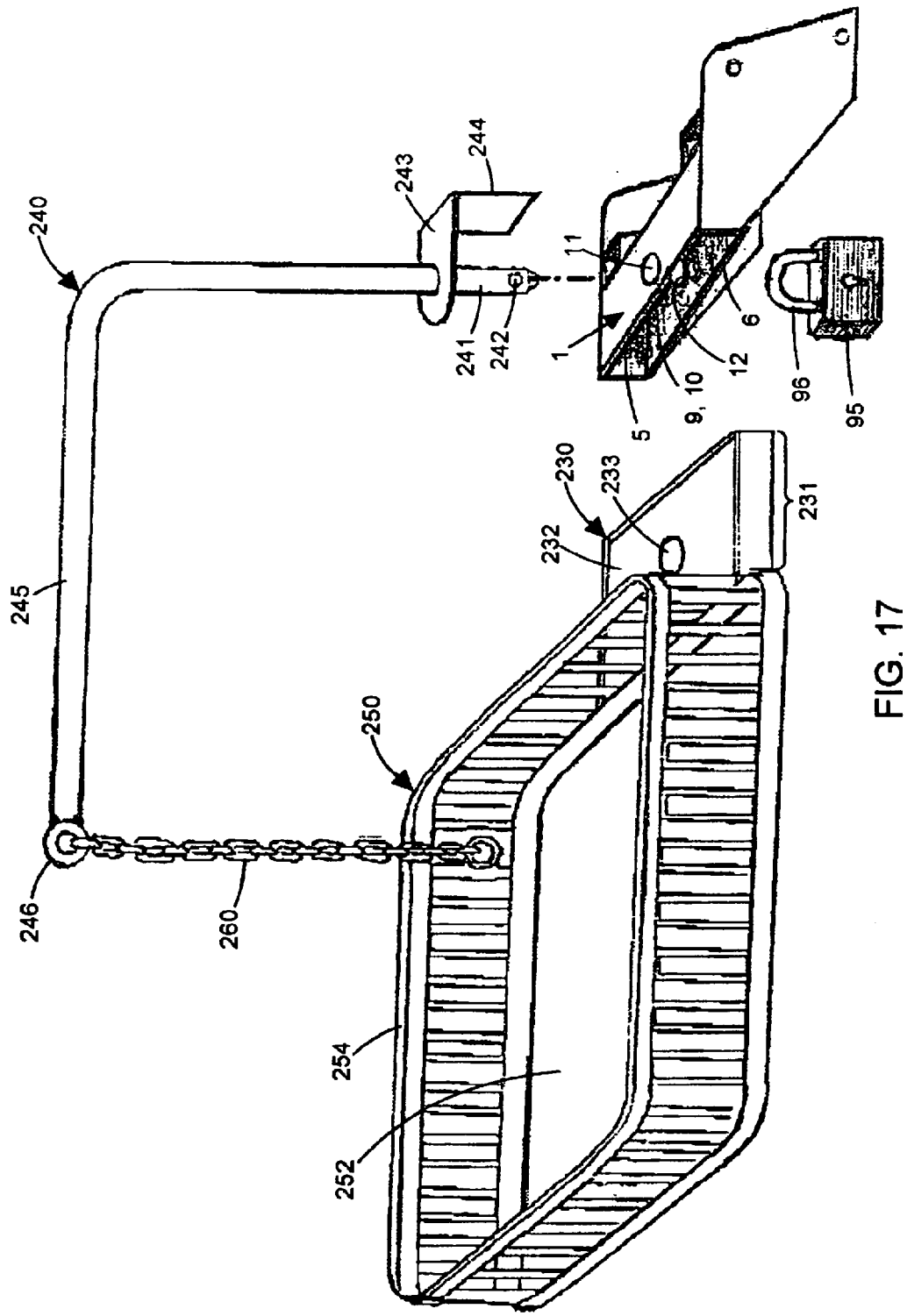
FIG. 17 is an exploded perspective view of the housing shown in FIG. 1, a platform accessory for carrying an animal, and a tethering pole. An accessory coupler is connected to the platform, and a hitch pin is formed at one end of the tethering pole.

The embodiment illustrated in FIG. 17 comprises housing 1, an accessory coupler generally designated 230 and a tethering pole generally designated 240, end 241 of which is formed to serve as a hitch pin. Accessory coupler 230 has an accessory end connected to the lower forward side of a platform accessory generally designated 250 which is adapted to carry an animal such as a cat or dog (not shown), and a coupling end 231 which extends forwardly from the platform accessory. Coupling end 231 is sized substantially the same as accessory coupler 60 discussed above. It includes a cross-member 232 like cross-member 177, and a hole 233 through cross-member 232 like hole 178 through cross-member 177. Thus, while supporting platform accessory 230, coupling end 231 is telescopically receivable by sleeve 9 of housing 1 and, in principle, may be secured within the sleeve by a hitch pin 50 in the same manner as accessory coupler 60. Instead, however, coupling end 231 is advantageously secured by inserting end 241 of tethering pole 240 through hole 11 in upper wall 5 of housing 1, hole 233 in cross-member 232 of coupler 230, and hole 6 in lower wall 12 of housing 1 to a distance where bracket 243 abuts the top surface of upper wall 5. Bracket 243 is fixedly secured to pole 240 by suitable means (e.g. welding) and includes a flange 244 which is positioned to slide against the forward edge of upper wall 5 during insertion of end 241 thereby directing upper arm 245 of the pole directly rearward, and also preventing rotation of pole 240 when inserted.

A transverse hole 242 is provided in end 241 of pole 240, and is sized to slidingly receive hasp 96 of padlock 95. Thus, coupler 230 may to be locked within sleeve 9 in the same manner as with a hitch pin.

Platform accessory 250 includes a base 252 on which an animal can ride in the open air, and a railing structure 254 extending peripherally around the base to provide a degree of confinement and a greater sense of security for the animal. It will be noted that upper arm 245 of tethering pole 240 extends rearwardly to a distal end 246 which is adapted for attachment of an animal harnessing leash 260. In use, leash 260 normally will be connected to a collar or body harness (not shown) worn by the animal. Preferably, leash 260 should be sufficiently long to allow the animal to sit, stand or lie down on base 252, but sufficiently short to prevent the animal from jumping or falling beyond the confines of railing 254.

Figure 18:
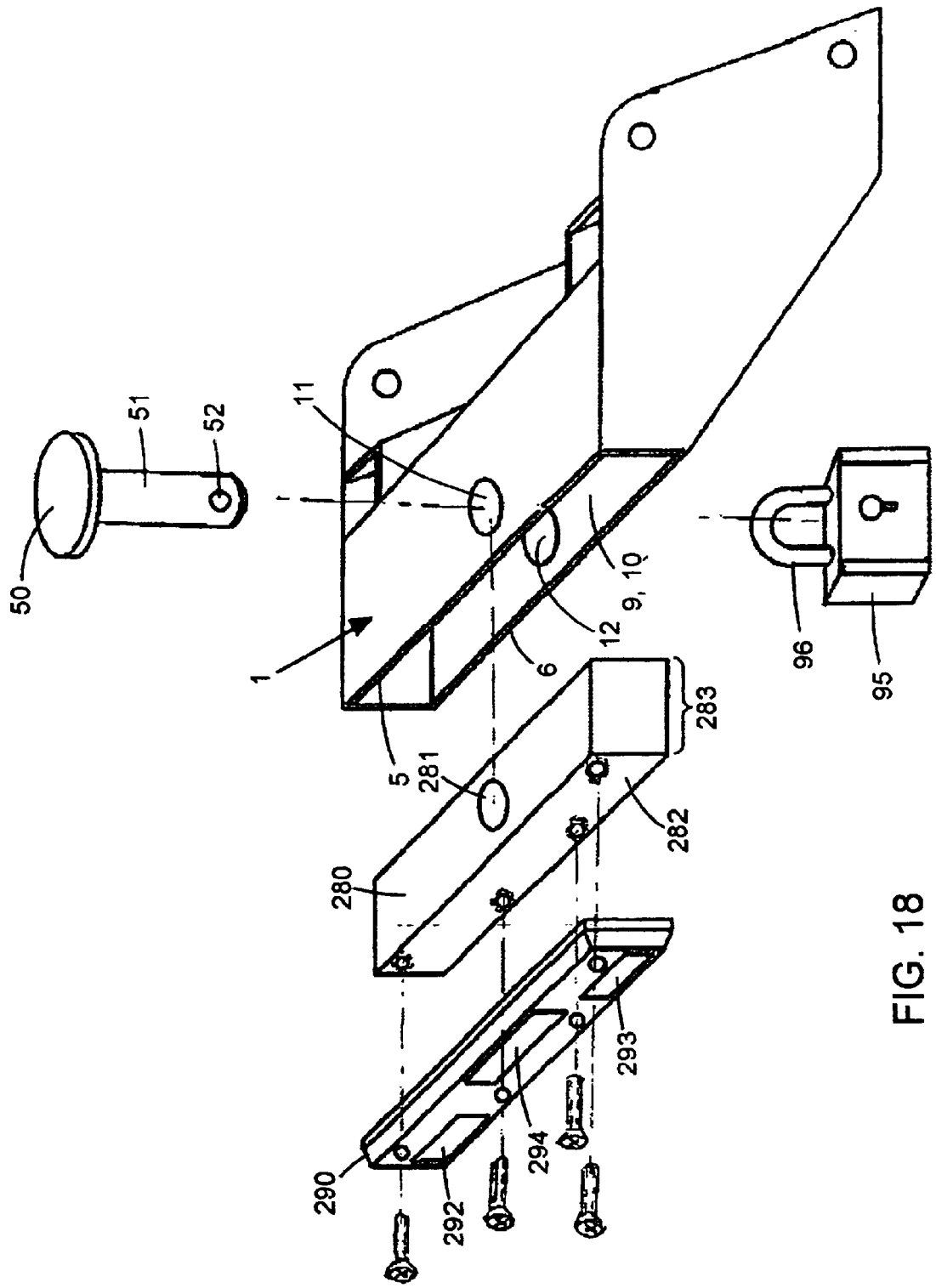
FIG. 18 is an exploded perspective view of the housing and hitch pin shown in FIG. 1, an accessory coupler, and a tail light accessory attachable to the coupler.

From the foregoing, it will be apparent that housing 1 together with a suitable accessory coupler can be used for interchangeably coupling a variety of differing vehicle accessories to a motorcycle—including differing platform accessories and differing accessories in the form of a motorcycle trailer. When not in use for any of such purposes, then as illustrated in FIG. 18 housing 1 together with an accessory coupler 280 may be used to couple a tail light accessory 290 which includes a brake light panel 291, and left and right turn signal panels 292, 293 (lamps and wiring are not shown). Coupler 280 includes a hole 281 for receiving hitch pin 50, an accessory end to which accessory 290 is normally bolted, and a coupling end 283. Coupling end 283 is sized to be telescopically received by sleeve 9 of housing 1 to a position where hole 281 aligns with hole 11 in upper wall 5 of housing 1 and with hole 12 in lower wall 6 of housing 1.

There, it may be secured with hitch pin 50 and locked with padlock 95 in the manner described above with reference to other embodiments.

To avoid the necessity to provide suitable wiring, it will be understood that a tail reflector panel (not shown) could be substituted for tail light accessory 290, thereby covering the otherwise open end of housing 1 while maintaining an attractive appearance.

Figure 19:
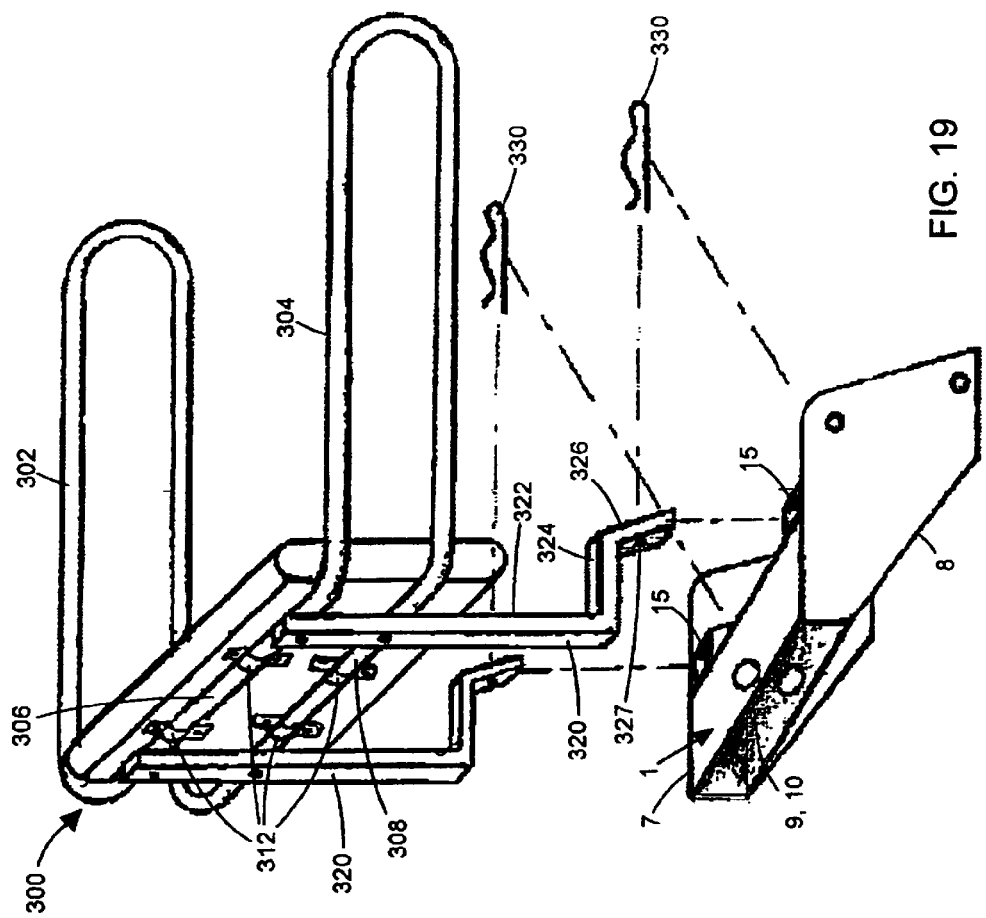
FIG. 19 is an exploded perspective view showing an arm and back rest accessory and the manner whereby it is coupled to the housing shown in FIG. 1.

Referring now to FIG. 19, there is shown an arm and back rest accessory generally designated 300. Accessory 300 includes a continuous cylindrical pipe bent into a U-shape to form a pair of arm rests 302, 304 with rearward connecting segments 306, 308. Accessory 300 further includes a back rest 310 which is clamped to segments 306, 308 by means of clamps 312, and a pair of rectangular cross-section tubular or coupling legs 320. Each leg 320 is bolted to connecting segments 306, 308 and includes an upper portion 322, a dog-leg portion 324, and a lower portion 326. Lower portion 326 of each leg includes a hole 327 passing through the leg. Accessory 300 is also shown in FIG. 9, albeit in less detail.

Figure 6:
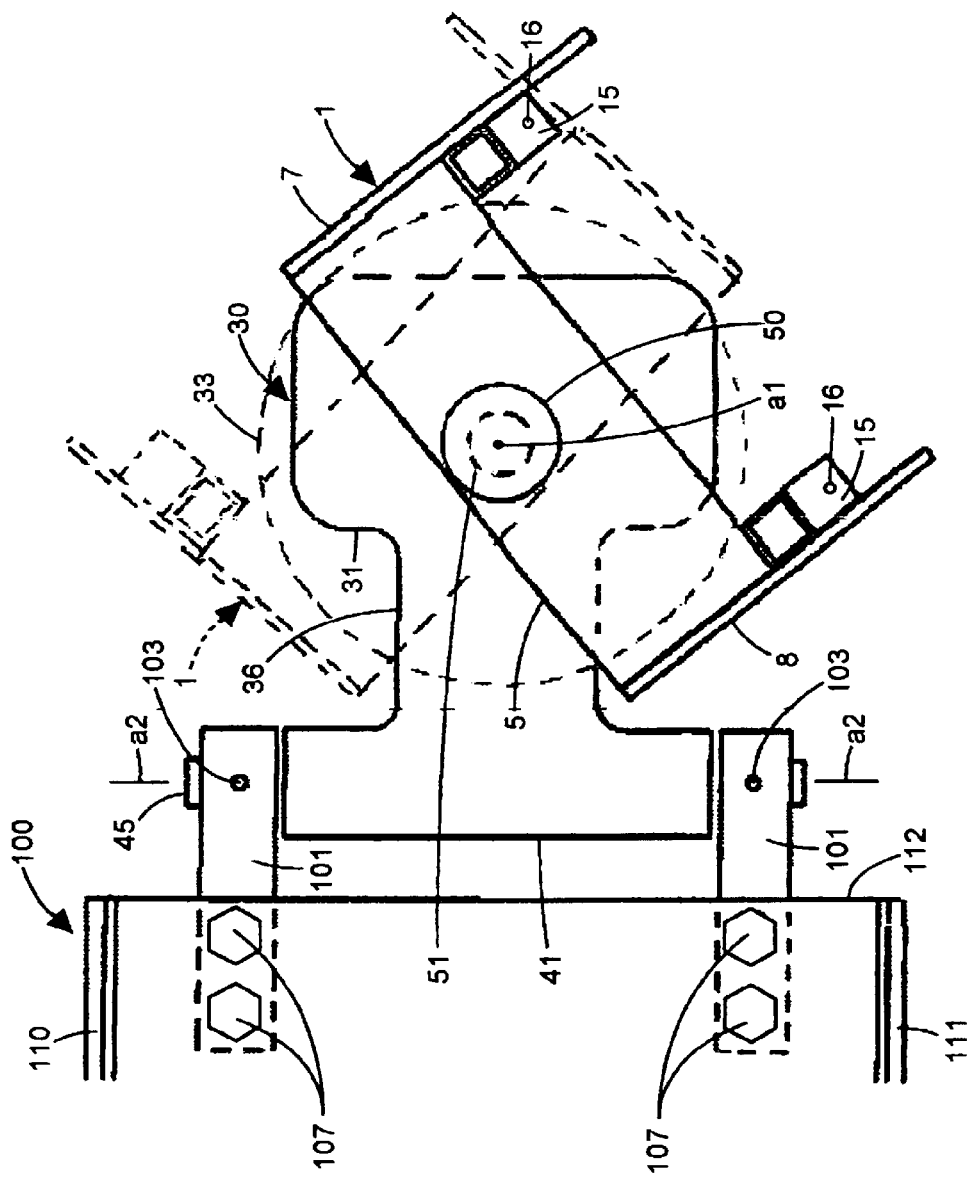
FIG. 6 is a top view showing relative pivotal movement between the housing and accessory coupler shown in FIG. 5.

FIG. 19 also depicts a pair of upwardly extending rectangular cross-section receptacles 15: one secured to side wall 7 of housing 1; the other secured to side wall 8 of housing 1. These same receptacles are depicted in several of the preceding figures. As best indicated in FIGS. 5–6, each receptacle 15 includes a hole 16 extending through the forward wall of the receptacle.

Each receptacle 15 is sized to slidingly receive one of coupling legs 320 or, more particularly, the lower portion 326 of one of coupling legs 320. When fully received, the dog-leg portion 324 of each leg abuts against the top surface of upper wall 5 of housing 1 and hole 327 in the leg aligns with hole 16 in the receptacle. This enables the leg to be releasably secured in the receptacle by means such as a spring clip 330 as shown in FIG. 19.

It will be understood that receptacles 15 which are advantageously integrated with housing 1 provide a means for coupling an accessory to a motorcycle independently of any accessory coupled to the motorcycle via sleeve 9 of housing 1.

Referring now to FIG. 11, there is shown an arm rest accessory generally designated 350. Accessory 350 is substantially the same as accessory 300, but for the absence of a back rest 310 as shown in FIG. 9. In the case of FIG. 11, a back rest 401 is part of "sissy bar" 400 and is therefore not needed in conjunction with arm rests. In this regard, it will be understood that while a back rest may be desirable it is never essential. Nevertheless, FIG. 11 shows that the present invention enables arm rests to be provided even if motorcycle 200 already includes a sissy bar with a back rest.

It has been found that in some circumstances, particularly in the case of some scooters, there may be insufficient room to add receptacles such as receptacles 15 for coupling an arm rest accessory or an arm and back rest accessory to housing 1 independently of sleeve 9. In some of such circumstances, and as shown in FIG. 20, it has been found the problem can be addressed by securing suitable receptacles atop upper wall 5 of housing 1.

Figure 20:
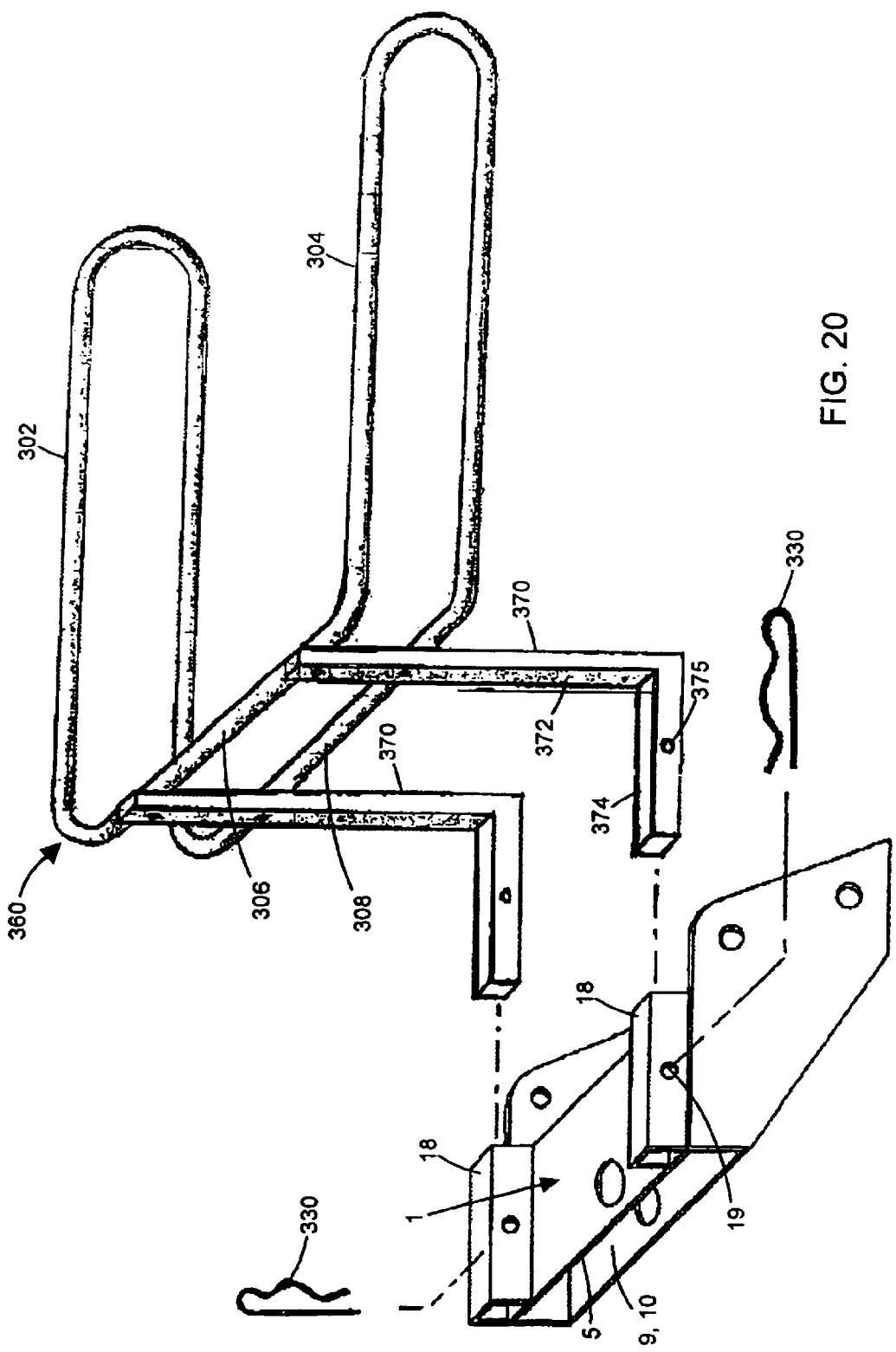
FIG. 20 is an exploded perspective view showing a modified housing and modified arm rest accessory.

In FIG. 20, there is shown an arm rest accessory generally designated 360 which includes a continuous cylindrical pipe bent into a U-shape as in the case of FIG. 19 to form a pair of arm rests 302, 304 with rearward connecting segments 306, 308. A back rest is not included but obviously could be added if desired. The arm rest assembly also includes a pair of rectangular cross-section tubular or coupling legs 370.

Each leg 370 is bolted to connecting segments 306, 308 and includes an upwardly extending portion 372, and a rearwardly extending portion 374. Rearwardly extending portion 374 of each leg includes a hole 375 passing through the leg.

FIG. 20 also depicts a pair of elongated rectangular cross-section receptacles 18 extending atop upper wall 5 of housing 1. Each receptacle 18 includes holes 19 extending through side walls of the receptacle.

Each receptacle 18 is sized to slidingly receive one of coupling legs 370 or, more particularly, the rearwardly extending portion 374 of one of coupling legs 370. When fully received, hole 375 in the leg aligns with hole 19 in the receptacle. This enables the leg to be releasably secured in the receptacle by means such as a spring clip 330 as shown in FIG. 20.

Variations

A variety of modifications, changes and variations to the invention are possible within the spirit and scope of the following claims, and will undoubtedly occur to those skilled in the art. The invention should not be considered as restricted to the specific embodiments that have been described and illustrated with reference to the drawings.

I claim:

1. Apparatus for releasably coupling a motorcycle accessory to a motorcycle, said apparatus comprising:
   (a) a housing comprising an upper wall, a lower wall, and opposed side walls extending between said upper and lower walls;
      (i) said walls together defining a sleeve having an open rearward end, a sleeve height between said upper and lower walls and a sleeve width between said side walls, said sleeve width being substantially greater than said sleeve height;
      (ii) said upper and lower walls each having an associated hole centrally positioned widthwise of said sleeve, said holes being aligned on a common axis; and,
      (iii) said housing being adapted for attachment in an operative position to said motorcycle in a location above a rear fender of said motorcycle with said open end of said sleeve depending rearwardly,
   (b) an accessory coupler for coupling a motorcycle accessory to said housing, said coupler including an accessory end for connecting to said accessory and a coupling end slidably receivable by said sleeve through said open end, said coupling end including an associated hole alignable with said common axis when said coupling end is so received by said sleeve; and,
   (c) a hitch pin removably insertable through all of said holes to a position securing said coupling end within said sleeve.

2. Apparatus as defined in claim 1, wherein said coupling end is pivotally securable by said hitch pin within said sleeve for pivotal movement of said coupler on said common axis.

3. Apparatus as defined in claim 1, wherein:
   (a) said coupling end comprises a generally disk-shaped head, said associated hole of said coupling end extending through said head between substantially flat, parallel upper and lower surfaces of said head, said head being pivotally securable by said hitch pin within said sleeve for pivotal movement of said coupler on said common axis while said head receives bearing support on said surfaces from said upper and lower walls of said housing; and,
   (b) said coupler further comprises a shank extending longitudinally away from said head to said accessory end, said accessory end being adapted for connection of a motorcycle trailer to said accessory end, said connection permitting pivotal movement of said trailer relative to said motorcycle on an axis extending transverse to said common axis.

4. Apparatus as defined in claim 3, wherein said disk-shaped head is oblong.

5. Apparatus as defined in claim 4, wherein said disk-shaped head has:
   (a) a minor axis having a length extending in line with said shank; and,
   (b) a major axis intersecting and extending transverse to said minor axis, said major axis having a length greater than the length of said minor axis.

6. Apparatus as defined in claim 4, wherein said hitch pin is adapted to be locked in said position securing said coupling end within said sleeve.

7. Apparatus as defined in claim 4, wherein said coupling end is telescopically receivable by said sleeve through said open end, said coupling end being sized such that movement of said coupling end within said sleeve other than telescoping movement is restrained by said sleeve.

8. Apparatus as defined in claim 7, wherein said accessory end connects to a platform accessory.

9. Apparatus as defined in claimed 7, wherein:
   (a) said coupler extends to said coupling end forwardly from a platform accessory adapted to carry an animal; and,
   (b) said hitch pin is formed at one end of a tethering pole, said pole extending from said one end to a second end, said second end being adapted for attachment of an animal harnessing leash.

10. Apparatus as defined in claim 7, wherein said hitch pin is adapted to be locked in said position securing said coupling end within said sleeve.

11. Apparatus for releasably coupling a motorcycle accessory to a motorcycle, said motorcycle including a pair of fender struts extending upwardly from a rear fender of said motorcycle, said apparatus comprising:
   (a) a housing comprising an upper wall, a lower wall, and opposed side walls extending between said upper and lower walls;
      (i) said walls together defining a sleeve having an open rearward end, a sleeve height between said upper and lower walls, a sleeve width between said side walls, and a sleeve length between said rearward end and a forward end of said sleeve, said sleeve width being substantially greater than said sleeve height;
      (ii) said upper and lower walls each having an associated hole centrally positioned widthwise of said sleeve, said holes being aligned on a common axis; and,
      (iii) each of said side walls being adapted for attachment to a respective one of said fender struts so as to attach said housing in an operative position to said motorcycle in a location above said rear fender with said open end of said sleeve depending rearwardly,
   (b) an accessory coupler for coupling a motorcycle accessory to said housing, said coupler including an accessory end for connecting to said accessory and a coupling end slidably receivable by said sleeve through said open end, said coupling end including an associated hole alignable with said common axis when said coupling end is so received by said sleeve; and,
   (c) a hitch pin removably insertable through all of said holes to a position securing said coupling end within said sleeve.

12. Apparatus as defined in claim 11, said apparatus further comprising a pair of upwardly extending elongated receptacles, each secured to a respective one of said side walls, said receptacles being sized to slidably receive first and second coupling legs of a second motorcycle accessory.

13. Apparatus as defined in claim 12, wherein said second motorcycle accessory comprises arm rests.

14. Apparatus as defined in claim 11, said apparatus further comprising a pair of elongated receptacles extending longitudinally atop said upper wall, each of said receptacles being sized to slidably receive first and second coupling legs of a second motorcycle accessory.

15. Apparatus as defined in claim 14, wherein said second motorcycle accessory comprises arm rests.

* * * * *